United States Patent
Yao et al.

(10) Patent No.: US 12,531,686 B2
(45) Date of Patent: Jan. 20, 2026

(54) METHODS FOR BEAM STATE UPDATING FOR UPLINK TRANSMISSION

(71) Applicant: ZTE CORPORATION, Guangdong (CN)

(72) Inventors: Ke Yao, Shenzhen (CN); Bo Gao, Shenzhen (CN); Chuangxin Jiang, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 371 days.

(21) Appl. No.: 18/117,052

(22) Filed: Mar. 3, 2023

(65) Prior Publication Data

US 2024/0297755 A1   Sep. 5, 2024

Related U.S. Application Data

(63) Continuation of application No. PCT/CN2020/123073, filed on Oct. 23, 2020.

(51) Int. Cl.
| | |
|---|---|
| *H04W 72/21* | (2023.01) |
| *H04B 7/06* | (2006.01) |
| *H04L 5/00* | (2006.01) |
| *H04W 72/232* | (2023.01) |

(52) U.S. Cl.
CPC ......... *H04L 5/0048* (2013.01); *H04B 7/0695* (2013.01); *H04W 72/21* (2023.01); *H04W 72/232* (2023.01)

(58) Field of Classification Search
CPC ... H04W 72/21; H04W 72/23; H04W 72/231; H04W 72/232; H04L 5/0048; H04L 5/0023; H04L 5/0044; H04L 5/0051; H04B 7/0695

USPC .......................................................... 370/329
See application file for complete search history.

(56) References Cited

U.S. PATENT DOCUMENTS

| | | | |
|---|---|---|---|
| 2020/0136711 A1* | 4/2020 | Cao ..................... | H04B 7/0626 |
| 2020/0212981 A1 | 7/2020 | Guo et al. | |
| 2022/0217736 A1* | 7/2022 | Taherzadeh Boroujeni ................ | |
| | | | H04L 5/0094 |
| 2022/0264475 A1* | 8/2022 | Yi ......................... | H04W 52/42 |
| 2022/0368509 A1* | 11/2022 | He ....................... | H04B 7/0617 |

(Continued)

FOREIGN PATENT DOCUMENTS

| | | |
|---|---|---|
| CN | 109729533 A | 5/2019 |
| CN | 111901020 A | 11/2020 |

(Continued)

OTHER PUBLICATIONS

CATT: "Discussion on enhancements on multi-TRP/panel for PDCCH, PUCCH and PUSCH" 3GPP TSG RAN WG1 Meeting #103-e; R1-2007825; Nov. 13, 2020; e-Meeting (15 pages).

(Continued)

*Primary Examiner* — Jean A Gelin
(74) *Attorney, Agent, or Firm* — Foley & Lardner LLP

(57) ABSTRACT

System, methods and apparatuses for updating beam state for uplink transmission can include a wireless communication node transmitting, and a wireless communication device receiving, a command signaling that indicates beam state information for a plurality of target transmissions. The wireless communication device can determine, according to the beam state information, parameters of the plurality of target transmissions.

17 Claims, 4 Drawing Sheets

(56) References Cited

U.S. PATENT DOCUMENTS

| | | | |
|---|---|---|---|
| 2022/0385381 A1* | 12/2022 | MolavianJazi | H04W 52/48 |
| 2023/0030275 A1* | 2/2023 | Huang | H04B 7/0695 |
| 2023/0045267 A1* | 2/2023 | Kumagai | H04W 72/1268 |
| 2023/0050480 A1* | 2/2023 | Zhu | H04L 5/0023 |
| 2023/0171621 A1* | 6/2023 | Zhu | H04W 24/04 370/242 |
| 2025/0119910 A1* | 4/2025 | Zhang | H04W 74/0816 |
| 2025/0132804 A1* | 4/2025 | Hindy | H04W 72/1268 |

FOREIGN PATENT DOCUMENTS

| | | |
|---|---|---|
| CN | 111954249 A | 11/2020 |
| WO | WO-2019/029515 A1 | 2/2019 |

OTHER PUBLICATIONS

Convida Wireless, "Multi-TRP Enhancements for PDCCH, PUCCH and PUSCH", 3GPP TSG-RAN WG1#103-e, R1-2009159, Nov. 13, 2020, e-Meeting (6 pages).

Ericsson, "On PDCCH, PUCCH and PUSCH enhancements with multiple TRPs", 3GPP TSG-RAN WG1 Meeting #103, R1-2009223, Nov. 13, 2020, e-Meeting (28 pages).

Itri, "Discussion on channel access mechanism", 3GPP TSG RAN WG1#102-e, R1-2006655, Aug. 28, 2020, e-Meeting (5 pages).

Lenovo et al., "Enhancements on Multi-TRP for PDCCH, PUCCH and PUSCH", 3GPP TSG RAN WG1 #103-e, R1-2008911, Nov. 13, 2020, e-Meeting (15 pages).

Moderator (Nokia) et al., "Summary of Multi-TRP URLLC for PUCCH and PUSCH", 3GPP TSG RAN WG1 #103, R1-2009480, Nov. 13, 2020, e-Meeting (80 pages).

Moderator (Samsung), "Moderator summary for multi-beam enhancement", 3GPP TSG RAN WG1 #103-e, R1-2008147, Nov. 13, 2020, e-Meeting (30 pages).

Moderator (Samsung), "Moderator summary#2 for multi-beam enhancement", 3GPP TSG RAN WG1 #103-e, R1-2009499, Nov. 13, 2020, e-Meeting (41 pages).

Moderator (Samsung), "Moderator summary#3 for multi-beam enhancement", 3GPP TSG RAN WG1 #103-e, R1-2009574, Nov. 13, 2020, e-Meeting (21 pages).

NTT Docomo, Inc., "Discussion on MTRP for reliability" 3GPP TSG RAN WG1 #103-e, R1-2009175, Nov. 13, 2020, e-Meeting (11 pages).

OPPO, "Discussion on the remaining issues of channel access procedure", 3GPP TSG RAN WG1 #101-E, R1-2004085, Jun. 5, 2020, e-Meeting (7 pages).

Qualcomm Incorporated, "Enhancements on Multi-TRP for PDCCH, PUCCH and PUSCH", 3GPP TSG-RAN WG1 Meeting #103-e, R1-2009251, Nov. 13, 2020, e-Meeting (33 pages).

Samsung, "Enhancements on Multi-TRP for PDCCH, PUCCH and PUSCH", 3GPP TSG RAN WG1 #103-e, R1-2008149, Nov. 13, 2020, e-Meeting (11 pages).

Spreadtrum Communications, "Discussion on enhancements on Multi-TRP for PDCCH, PUCCH and PUSCH", 3GPP TSG RAN WG1 #103-e, R1-2009142, Nov. 13, 2020, e-Meeting (13 pages).

Vivo: "Further discussion on enhancement of MTRP operation" 3GPP TSG RAN WG1 #103-e; R1-2007645; Nov. 13, 2020; e-Meeting (15 pages).

Xiaomi, "Enhancements on Multi-TRP for PDCCH, PUCCH and PUSCH", 3GPP TSG RAN WG1 #103-e, R1-2009028, Nov. 13, 2020, e-Meeting (18 pages).

ZTE: "Multi-TRP enhancements for PDCCH, PUCCH and PUSCH" 3GPP TSG RAN WG1 Meeting #103-e; R1-2007764; Nov. 13, 2020; e-Meeting (22 pages).

Huawei et al.: "QCL indication of downlink control channel and beam management reference signals" 3GPP TSG RAN WG1 NR Ad Hoc Meeting; R1-1700405; Jan. 20, 2017; Spokane, USA (4 pages).

International Search Report and Written Opinion for PCT Appl. No. PCT/CN2020/123073, mailed Jul. 21, 2021 (9 pages).

* cited by examiner

METHODS FOR BEAM STATE UPDATING FOR UPLINK TRANSMISSION

CROSS-REFERENCE TO RELATED APPLICATION

This application claims the benefit of priority under 35 U.S.C. § 120 as a continuation of International Patent Application No. PCT/CN2020/123073, filed on Oct. 23, 2020, the disclosure of which is incorporated herein by reference in its entirety.

TECHNICAL FIELD

The disclosure relates generally to wireless communications, including but not limited to systems and methods for beam state updating for uplink transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive, from a wireless communication node, a command signaling that indicates beam state information for a plurality of target transmissions. The wireless communication device may determine, according to the beam state information, parameters of the plurality of target transmissions.

The command signaling may comprise a downlink control information (DCI) signaling or a medium access control control element (MAC CE) signaling. The beam state information may comprise at least one of a quasi co-location (QCL) information, a transmission configuration indicator (TCI) state, spatial relation information, reference signal information, spatial filter information or precoding information.

In some embodiments, the plurality of target transmissions may comprise at least one of a physical downlink control channel (PDCCH) transmission, a physical uplink control channel (PUCCH) transmission, a channel state information reference signal (CSI-RS) transmission, a sounding reference signal (SRS) transmission, a dynamic grant (DG) physical uplink shared channel (PUSCH) transmission, a type 1 configured grant (CG) PUSCH transmission, a type 2 CG PUSCH transmission, or a physical downlink shared channel (PDSCH) transmission. The wireless communication device may determine, according to the beam state information, a first parameter of the parameters that is indicative of a reference sounding reference signal (reference SRS) of at least one of the type 1 CG PUSCH transmission or the type 2 CG PUSCH transmission. The wireless communication device may further perform at least one of (i) determining, according to a downlink control information (DCI) signaling or the beam state information, a parameter indicative of at least one of a pathloss reference signal (PL-RS), a transmitted precoding matrix indicator (TPMI), a number of layers, an antenna port, a modulation and coding scheme (MCS), or a transmission block size (TBS), (ii) determining at least one of: at least one radio resource control (RRC) parameter, at least one access control control element (MAC CE) parameter, or at least one downlink control information (DCI) parameter, that remains same as for at least a previous PUSCH transmission, (iii) determining a parameter according to a rule of a fixed TBS or a fixed code rate for a plurality of CG PUSCH transmissions, or (iv) determining a parameter according to a default or predefined scheme.

In some embodiments, the wireless communication device may determine, according to a shared beam state of the beam state information, a parameter indicative of a reference sounding reference signal (reference SRS) in case a condition is satisfied. The wireless communication device may determine to maintain at least one parameter unchanged in case the condition is not satisfied. The defined condition may comprise the wireless communication device receiving an indication to enable determination of the parameter indicative of the reference SRS. The indication may be configured for at least one of the DG PUSCH transmission, the type 1 CG PUSCH transmission or the type 2 CG PUSCH transmission. The defined condition may comprise that a number of a port for a CG PUSCH transmission is 1. The defined condition may comprise that the shared beam state is indicated via a downlink control information (DCI) transmission for scheduling an uplink transmission.

In some embodiments, the wireless communication device may determine, according to the beam state information, a first parameter for a target transmission, when a first time instance occurring a first time period after the command signaling is earlier than a second time instance occurring a second time period prior to the target transmission. The first time period may be determined according to (i) a transmission time of a feedback message of the wireless communication device, (ii) a transmission time of at least one SRS corresponding to the shared beam state, (iii) a processing time of the wireless communication node, or (v) a processing time of the wireless communication device. The second time period may be determined according to at least one of a capability of the wireless communication device, a minimum value of those provided by parameter k2 in a PUSCH-ConfigCommon information element, or a time period between a downlink control information (DCI) scheduling a target transmission and a start of the target transmission. The wireless communication device may determine, according to the beam state information, the first parameter for the target transmission with number of ports as 1, if the feedback message is not transmitted earlier than the second instance.

In some embodiments, the wireless communication device may determine, according to a first beam state of the beam state information, parameters of a configured grant (CG) physical uplink shared channel (PUSCH) transmission. The first beam state may comprise a beam state for a physical downlink control channel (PDCCH) transmission or a physical uplink control channel (PUCCH) transmission. The first beam state may comprise a beam state associated with a beam state indicated by the beam state information.

At least one aspect is directed to a system, method, apparatus, or a computer-readable medium. A wireless communication node may transmit, to a wireless communication device, a command signaling that indicates beam state information for a plurality of target transmissions. The beam state information may be for use by the wireless communication device to determine parameters of the plurality of target transmissions.

The command signaling may comprise a downlink control information (DCI) signaling or a medium access control control element (MAC CE) signaling. The beam state information may comprise at least one of a quasi co-location (QCL) information, a transmission configuration indicator (TCI) state, spatial relation information, reference signal information, spatial filter information or precoding information.

In some embodiments, the plurality of target transmissions may comprise at least one of a physical downlink control channel (PDCCH) transmission, a physical uplink control channel (PUCCH) transmission, a channel state information reference signal (CSI-RS) transmission, a sounding reference signal (SRS) transmission, a dynamic grant (DG) physical uplink shared channel (PUSCH) transmission, a type 1 configured grant (CG) PUSCH transmission, a type 2 CG PUSCH transmission or a physical downlink shared channel (PDSCH) transmission. The beam state information may be used by the wireless communication device to determine a first parameter of the parameters that is indicative of a reference sounding reference signal (reference SRS) of at least one of the type 1 CG PUSCH transmission or the type 2 CG PUSCH transmission. At least one of the following may occur; (i) a downlink control information (DCI) signaling or the beam state information is used by the wireless communication device to determine a parameter indicative of at least one of a pathloss reference signal (PL-RS), a transmitted precoding matrix indicator (TPMI), a number of layers, an antenna port, a modulation and coding scheme (MCS) or a transmission block size (TBS), (ii) at least one of at least one radio resource control (RRC) parameter, at least one access control control element (MAC CE) parameter, or at least one downlink control information (DCI) parameter, that remains same as for at least a previous PUSCH transmission, is determined by the wireless communication device, (iii) a parameter is determined by the wireless communication device according to a rule of a fixed TBS or a fixed code rate for a plurality of CG PUSCH transmissions, or (iv) a parameter is determined by the wireless communication device according to a default or predefined scheme.

In some embodiments, a parameter indicative of a reference sounding reference signal (reference SRS) may be determined by the wireless communication device, according to a shared beam state of the beam state information, in case a condition is satisfied. Also, a determination may be made by the wireless communication device to maintain at least one parameter unchanged in case the condition is not satisfied. The defined condition may comprise the wireless communication device receiving an indication to enable determination of the parameter indicative of the reference SRS. The indication may be configured for at least one of the DG PUSCH transmission, the type 1 CG PUSCH transmission or the type 2 CG PUSCH transmission. The defined condition may comprise that a number of a port for a CG PUSCH transmission is 1. The defined condition may comprise that the shared beam state is indicated via a downlink control information (DCI) transmission for scheduling an uplink transmission.

In some embodiments, a first parameter for a target transmission may be determined by the wireless communication device, according to the beam state information, when a first time instance occurring a first time period after the command signaling is earlier than a second time instance occurring a second time period prior to the target transmission. The first time period may be determined according to (i) a transmission time of a feedback message of the wireless communication device, (ii) a transmission time of at least one SRS corresponding to the shared beam state, (iii) a processing time of the wireless communication node, or (v) a processing time of the wireless communication device. The second time period may be determined according to at least one of a capability of the wireless communication device, a minimum value of those provided by parameter k2 in a PUSCH-ConfigCommon information element, or a time period between a downlink control information (DCI) scheduling a target transmission and a start of the target transmission. The first parameter for the target transmission may be determined with number of ports as 1 by the wireless communication device, according to the beam state information, if the feedback message is not transmitted earlier than the second instance.

In some embodiments, parameters of a configured grant (CG) physical uplink shared channel (PUSCH) transmission may be determined by the wireless communication device according to a first beam state of the beam state information. The first beam state may comprise a beam state for a physical downlink control channel (PDCCH) transmission or a physical uplink control channel (PUCCH) transmission. The first beam state may comprise a beam state associated with a beam state indicated by the beam state information.

Some of the embodiments described herein identify the parameters which are impacted by a shared beam state and the parameters which should not be changed for CG PUSCH. For example, reference SRS resource can be determined for PUSCH transmission according to the shared beam state. Also, PL-RS is updated to an RS which is associated with the shared beam state. Some of the embodiments described herein identify under which conditions the shared beam state should affect CG PUSCH transmission, such as a switch parameter, or one port transmission, among others. Some of the embodiments described herein identify effective time of the shared beam state for CG PUSCH, such as a time period after the shared beam state indication. The time period may depend on at least one of user equipment (UE) feedback message, at least one SRS resource based on the transmitted shared beam state or another time period for processing.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
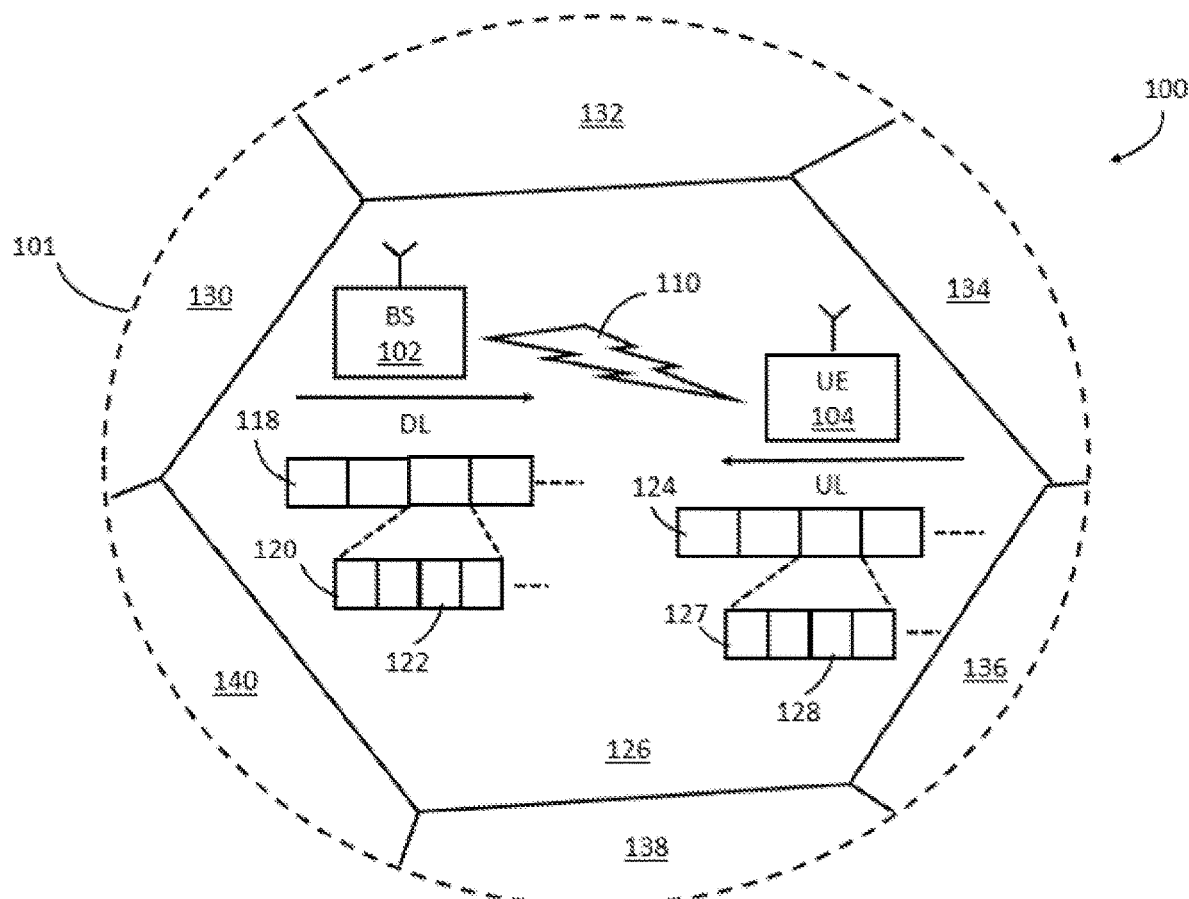
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
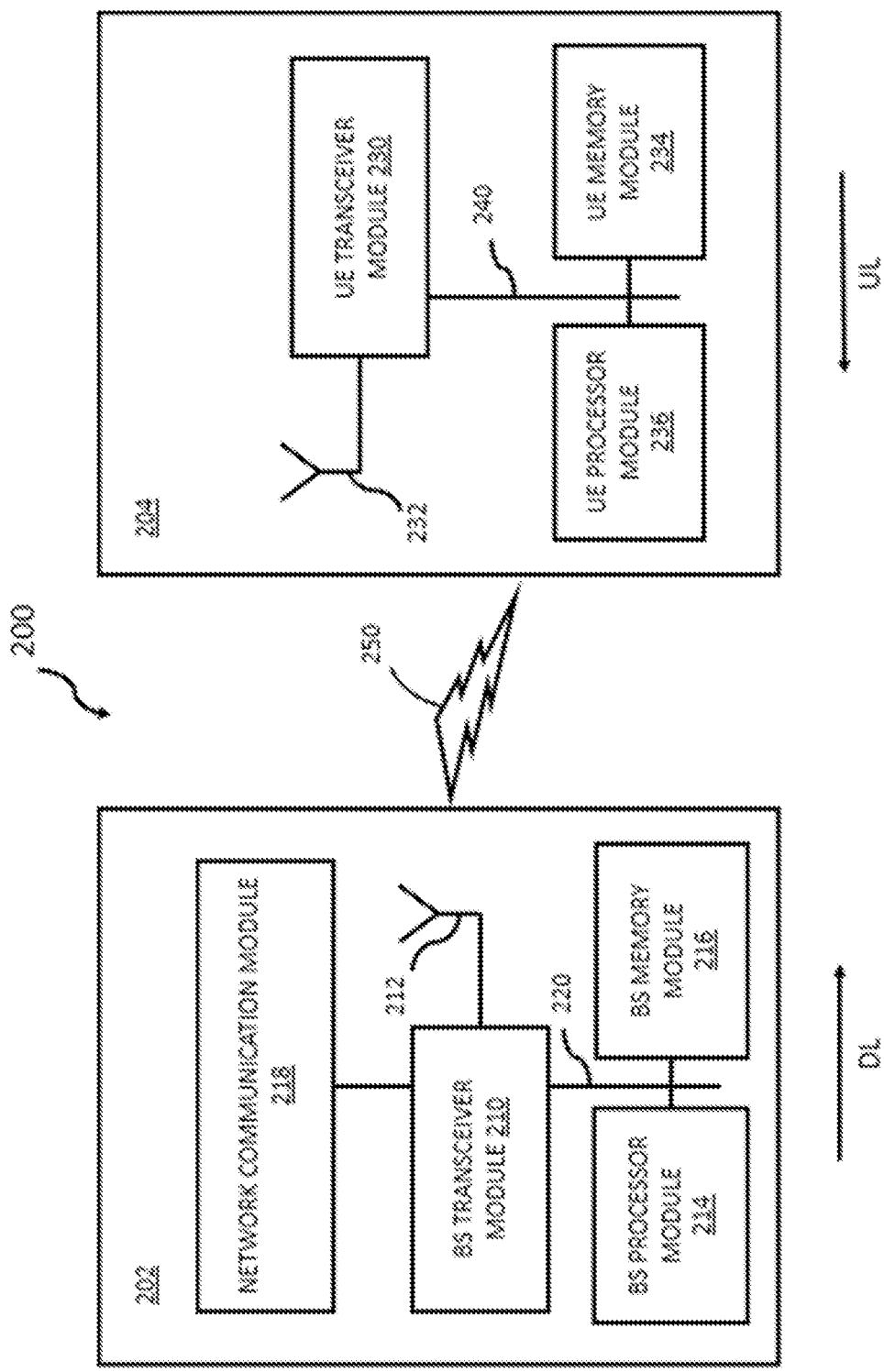
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods Beam State Updating for Uplink Transmission

One of the features of the new radio (NR) technology of fifth generation (5G) mobile communication systems is the support of high frequency bands. High frequency bands have abundant frequency domain resources. However, wireless signals in high frequency bands decay quickly resulting in relatively small coverage of the wireless signals. Thus, transmitting signals in a beam mode leads to concentrating energy in a relatively small spatial range and improving the coverage of the wireless signals in the high frequency bands. In the beam mode scenario, as the time and position change, a beam pair between a base station and a wireless communication device, e.g., a user equipment (UE), may also change. The change in the beam pair calls for a flexible beam update mechanism. Also, it is desired to have a mechanism to signal and/or update beam state for both uplink and downlink.

Some embodiments described herein allow for enhancing multi-beam technology by using unified transmission configuration indicator (TCI) architecture and/or shared beam state of uplink and downlink for data and control channels. According to unified TCI, wireless communication nodes, such wireless communication node 202, can use the TCI state to indicate/signal/communicate beam state for both uplink and downlink transmissions. The wireless communication node 202 may use TCI state only for beam state indication for downlink transmission, but not for uplink transmission. In such case, the wireless communication node 202 may signal/communicate the beam state indication for uplink transmissions, such as sounding reference signal (SRS) transmission, physical uplink control channel (PUCCH) transmission and/or physical uplink shared channel (PUSCH) transmission, using other methods. For instance, the wireless communication node 202 may define/determine respective spatial relations for SRS and PUCCH resources, and signal/transmit/communicate the beam state for SRS and PUCCH transmission via the spatial relation. As used herein, the spatial relation refers to an existing uplink/downlink (UL/DL) reference signal (RS). For PUSCH transmission, the wireless communication node 202 may signal/transmit/communicate the beam state via existing SRS resources.

The wireless communication node 202 may use a beam state indicated by downlink control information (DCI), for multiple channels, such as physical downlink shared channel (PDSCH), physical downlink control channel (PDCCH), physical uplink control channel (PUCCH) or physical uplink shared channel (PUSCH), among others. However, wireless communication node 202 may signal/communicate/indicate the beams' states for uplink and downlink transmissions independently. Also, the wireless communication node 202 may employ independent/separate beam state indication/signaling methods for the data channel, the control channel, and the reference signal.

Currently, NR PUSCH comprises dynamic grant (DG) PUSCH transmission and configured grant (CG) PUSCH transmission based on a scheduling scheme. That is, PUSCH transmission(s) can be dynamically scheduled by an UL grant in a DCI, in which case it is called DG PUSCH, or the transmission can correspond to a configured grant (CG) Type 1 or Type 2. The Type 1 CG PUSCH transmission is semi-statically configured to operate upon the reception of higher layer parameter of configuredGrantConfig including rrc-ConfiguredUplinkGrant without the detection of an UL grant in a DCI. The Type 2 CG PUSCH transmission is semi-persistently scheduled by an UL grant in a valid activation DCI after the reception of higher layer parameter configuredGrantConfig not including rrc-ConfiguredUplinkGrant. The parameters in higher layer parameter rrc-ConfiguredUplinkGrant are indicated in a DCI which is used to activate type 2 CG PUSCH transmissions.

Transmission parameters for CG PUSCH configured by radio resource control (RRC) signaling or by activation DCI, are applied for a series of CG PUSCH transmissions. When the wireless communication node 202, e.g., gNB, indicates a common beam state (also called a shared beam state) to a wireless communication device 204, whether and how the common beam state affects CG PUSCH transmission are unsettled issues. In the current disclosure, an improved scheme for signaling/communicating/indicating or updating beam state to wireless communication devices 204 can include signaling/communicating/indicating or updating a shared beam state for both uplink and downlink transmissions, or for any combination of control channel transmission, data channel transmission and reference signals.

Embodiments of the improved scheme can include identifying the parameters which are impacted by the shared beam state, and the parameters which should not be changed for CG PUSCH. For instance, the SRS resource can be determined for PUSCH transmission according to the shared beam state. Furthermore, the wireless communication node 202 can update pathloss reference signal (PL-RS) for an RS associated with the shared beam state. In addition, the wireless communication node 202 can determine the transmitted precoding matrix indicator (TPMI) and the number of layers for CG PUSCH based on the determined SRS resource. The wireless communication node 202 can update other parameters according to the shared beam state or activation DCI or DG PUSCH DCI, while some other parameters may remain unchanged.

Embodiments of the improved scheme can include identifying under which conditions the shared beam state would affect CG PUSCH transmission. Such conditions can include, for example, a switch parameter or a transmission port, among others. Some embodiments described herein identify/determine the effective time of the shared beam state for CG PUSCH. The effective time of the shared beam state can be a time period after the shared beam state indication. The time period can depend on at least one of a UE feedback message, at least one SRS resource determined based on the shared beam state or another time period for processing.

Figure 3:
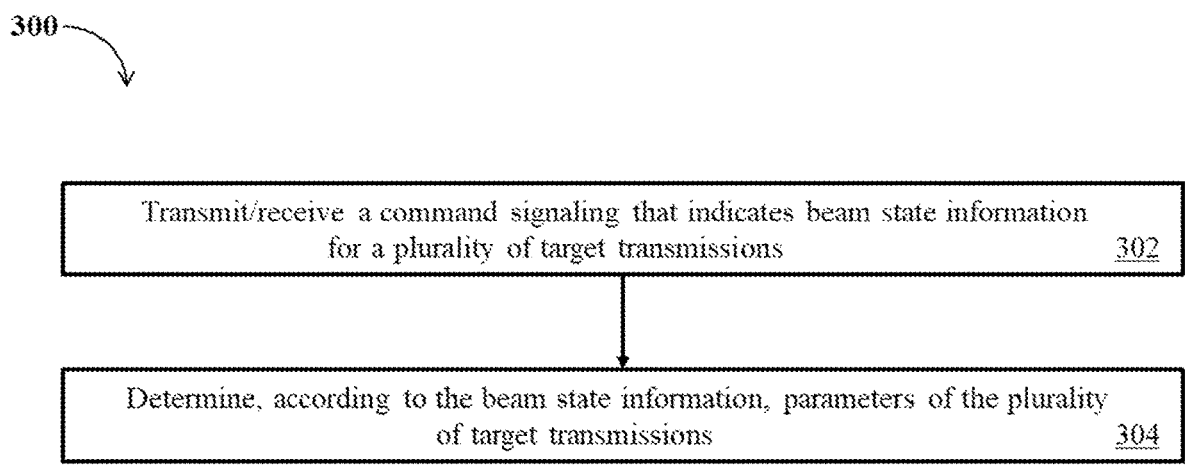
FIG. 3 is a flowchart illustrating a method of wireless communication, in accordance with some embodiments of the present disclosure.

Referring to FIG. 3, a flowchart illustrating a method 300 of wireless communication is shown, in accordance with some embodiments of the present disclosure. In brief overview, the method 300 can include a wireless communication node transmitting, and a wireless communication device receiving, a command signaling that indicates beam state information for a plurality of target transmissions (STEP 302), and the wireless communication device determining, according to the beam state information, parameters of the plurality of target transmissions (STEP 304). The method 300 can be viewed as a process performed by the wireless communication node, a process performed by the wireless communication device or a process performed by both.

The method 300 can include a wireless communication node 202 transmitting, and a wireless communication device 204 receiving, a command signaling that indicates beam state information for a plurality of target transmissions (STEP 302). The wireless communication node 202 can be a next generation nodeB (gNB). In some implementations, the command signaling can include a TCI signaling, a DCI signaling or a medium access control (MAC) control element (CE) signaling. In the case where the command signaling is DCI signaling, the beam state information in the DCI can indicate at least one beam state. The plurality of target transmissions can be associated with multiple channels, an uplink-downlink pair or combination of both. For instance, the target transmissions can include at least one of a PDCCH transmission, a PUCCH transmission, a channel state information reference signal (CSI-RS) transmission, a SRS transmission, a DG PUSCH transmission, a type 1 CG PUSCH transmission, a type 2 CG PUSCH transmission, a PDSCH transmission or a combination thereof. The beam state may include a quasi co-location (QCL) information, a TCI state, spatial relation information, reference signal (RS) information, spatial filter information, precoding information or a combination thereof.

The method 300 can include the wireless communication device 204 determining, according to the beam state information, parameters of the plurality of target transmissions (STEP 304). The wireless communication device 204 can extract/decode the beam state information from the command signaling, and determine the parameters of the plurality of target transmissions. The wireless communication device 204 may apply each determined parameter to the corresponding target transmission. The method 300 allows for updating or signaling/communicating/indicating the beam state, or shared beam state, for multiple channels, uplinks and downlinks or a combination thereof.

In some embodiments, the beam state (or TCI state) information may be used to signal or determine a reference SRS for CG PUSCH. In NR, the wireless communication node 202 (e.g., gNB) may configure at least one SRS resource set for the wireless communication device 204 (e.g., UE). Each SRS resource set may include at least one SRS resource. The wireless communication node 202 (e.g., gNB) may configure the SRS resource set with usage of beam management, antenna switching, codebook or non codebook. The wireless communication node 202 (e.g., gNB) can signal/indicate/communicate one or more SRS resources for PUSCH transmission to the wireless communication device 204. The SRS resource(s) is also called, or referred to as, a reference SRS. The wireless communication device 204 can identify the reference(s) SRS according to the received beam state (or TCI state) information, and determine the transmission parameters for PUSCH transmission.

The wireless communication node 202 can configure a PUSCH as codebook based or non-codebook based. For codebook based PUSCH, the wireless communication node 202 (e.g., gNB) may indicate/signal/communicate the reference SRS via a SRS resource indicator (SRI). For example, the wireless communication node 202 may use a SRS resource indicator field in a DCI or the RRC parameter srs-ResourceIndicator to indicate/signal/communicate the reference SRS(s). The wireless communication node 202 (e.g., gNB) may indicate/signal/communicate the TPMI and the number of layers via precoding information and the number of layers field in DCI or the RRC parameter precodingAndNumberOfLayers. For non-codebook based PUSCH, the wireless communication node 204 (e.g., gNB) may indicate the reference SRS(s) via SRI, e.g. using the SRS resource indicator field in a DCI, or the RRC parameter srs-ResourceIndicator. The wireless communication node 202 (e.g., gNB) may not need to indicate TPMI for non-codebook based PUSCH because the wireless communication device 204 (e.g., UE) can determine precoding information for non-codebook based PUSCH by itself.

The reference SRS for codebook based PUSCH usually corresponds to a SRS resource set with usage of a codebook, whereas the reference SRS for non-codebook based PUSCH corresponds to a SRS resource set with usage of non-codebook. If SRS resource set includes a single SRS resource, the wireless communication may not need to use SRI to indicate the reference SRS. The single SRS resource can be used as reference SRS.

Using a shared beam state scheme allows for updating beams as fast as possible. As such, the wireless communication node 202 can use the shared beam state scheme for both type 1 CG PUSCH and type 2 CG PUSCH. Specifically, the wireless communication node 202 can use the shared beam state scheme to signal/communicate/indicate the reference SRS(s) for both type 1 CG PUSCH and type 2 CG PUSCH. In other words, the shared beam state can replace the SRI, e.g. SRS resource indicator field in a DCI for type 2 CG PUSCH or RRC parameter srs-ResourceIndicator for type 1 CG PUSCH, to signal/communicate/indicate (by the wireless communication node 202) or determine/identify (by the wireless communication device 204) the reference SRS(s) for the corresponding PUSCH. The wireless communication device 204 can determine, using or according to the shared beam state, a parameter that is indicative of a reference SRS of at least one of the type 1 CG PUSCH transmission or the type 2 CG PUSCH transmission.

In the case where a single SRS resource is in the related SRS resource set, the wireless communication node 202 may transmit the single SRS resource according to the shared beam state. The usage of SRS resource set can be the same as the parameter txConfig of PUSCH. The value of parameter txConfig of PUSCH can be codebook or non-codebook.

Determining parameters of multiple target transmissions can include the wireless communication device 204 (e.g., UE) determining the reference SRS of CG PUSCH according to the shared beam state indicated by the command signaling. With respect to the reference SRS of CG PUSCH, the wireless communication device 204 (e.g., UE) may also need other parameters to determine the transmission precoder for PUSCH. For codebook based CG PUSCH, the wireless communication device 204 can determine the PUSCH transmission precoder based on reference SRS resource, TPMI and the transmission rank. The wireless communication device 204 can determine the TPMI and the transmission rank using/from a DCI field for precoding information and number of layers. The wireless communication device 204 can determine the reference SRS resource using (or according to) shared beam state.

The wireless communication node 202 can use the TPMI to indicate the precoder to be applied over the layers $\{0 \ldots v-1\}$ and that corresponds to the reference SRS resource determined according to the shared beam state. If a single SRS resource is configured, the wireless communication node 202 can use the TPMI indicate the precoder to be applied over the layers $\{0 \ldots v-1\}$ and that corresponds to the SRS resource. The wireless communication node 202 may select the transmission precoder from the uplink codebook that has a number of antenna ports equal to the higher layer parameter nrofSRS-Ports in SRS-Config for the reference SRS resource. When the wireless communication device 204 (e.g., UE) is configured with the higher layer parameter txConfig set to 'codebook', the wireless communication device 204 can be configured with at least one SRS resource.

The reference SRS resource in slot n may be associated with the most recent transmission of reference SRS resource. The SRS resource may be prior to the PDCCH carrying the shared beam state or prior to a time period before the PUSCH transmission. The time period can depend on the capability of the wireless communication device 204. For instance, the time period can be a number of $K_{PUSCH,min}$ symbols equal to the product of a number of symbols per slot $N_{symb}^{slot}$ and the minimum of the values provided by k2 in PUSCH-ConfigCommon for active UL BWP b of carrier f of serving cell c. The time period can be $T_{proc,2}$ which is determined assuming $d_{2,1}=1$, $d_{2,2}=0$, and with $\rho_{DL}$ corresponding to the subcarrier spacing of the active downlink BWP of the scheduling cell for a configured grant if the first PUSCH transmission is on a configured grant after a power headroom report was triggered. For non-codebook based CG PUSCH, the wireless communication device 204 can determine the PUSCH precoder and the transmission rank based on the reference SRS resource. Only one SRS port for each SRS resource can be configured.

In some embodiments, the wireless communication node 202 may signal/communicate/transmit/deliver one or more other parameters to the wireless communication device 204 (e.g., UE), such as a TPMI, a number of layers, an antenna port, a modulation and coding scheme (MCS), a transmission block size (TBS) or a combination thereof, among others. The wireless communication device 204 can determine, according to a DCI signaling, beam state information or the shared beam state, a parameter indicative of at least one of the pathloss reference signal (PL-RS), TPMI, the number of layers, the antenna port, the MCS, or the TBS, among others. The DCI signaling is used to schedule a DG PUSCH transmission;

In some implementations, the beam state information may be used to determine a pathloss reference signal (PL-RS). The PL-RS is used to determine pathloss value for transmission parameter, e.g. transmit power, for an uplink transmission. The wireless communication device 204 may determine, according to or using the beam state information, a parameter indicative of the PL-RS. In some implementations, the wireless communication device 204 may determine a parameter that remains the same as for a parameter used for previous PUSCH transmission. The parameter used for previous PUSCH transmission may be signaled/communicated/transmitted by the wireless communication node 202, and may include at least one RRC parameter or at least one DCI parameter, Such parameter(s) can include one or more RRC parameters configured for type 1 CG PUSCH, one or more RRC parameters and activation DCI for type 2 CG PUSCH, time domain parameter(s), frequency domain parameter(s), antenna port or a combination thereof, among others. The wireless communication device 204 can determine at least one of such parameters that remain the same (or unchanged) compared to at least a previous PUSCH transmission.

In some implementations, the wireless communication device 204 may determine a parameter, e.g., MCS, according to a rule of a fixed TBS or a fixed code rate for a plurality of CG PUSCH transmissions. The wireless communication device 204 may keep/maintain the fixed TBS or code rate for different CG PUSCH transmissions with the same CG PUSCH configuration. In some implementations, the wireless communication device 204 may determine a parameter according to a default or predefined scheme. For instance, when adopting the shared beam state the number of layers may be fixed to 1. As such, the wireless communication device 204 can determine the number of layers to be equal to 1.

In some embodiments, the wireless communication device 204 may determine parameters based on a shared beam state if one or more conditions are satisfied/met. For instance, the wireless communication device 204 may determine, according to a shared beam state of the beam state information, a parameter indicative of a reference SRS (e.g., used for CG PUSCH) in case a condition is satisfied. The wireless communication device 204 may determine to maintain/keep at least one parameter unchanged in case the condition is not satisfied. The wireless communication device 204 may maintain/keep the at least one parameter unchanged for CG PUSCH with respect to (or compared to) the previous PUSCH transmission. The wireless communication node 202 (e.g., gNB) can configure a parameter/indication as function/enable switch. The wireless communication device 204 can check whether the parameter/indication is delivered/provided/signaled or enabled. When the parameter/indication is delivered/provided/signaled or enabled by the wireless communication node 202, the wireless communication device 204 can determine the reference SRS (e.g., for CG PUSCH) according to the shared beam state. Such function/enable switch parameter/indication can be configured/used for all kinds of PUSCH, for CG PUSCH, for type1 CG PUSCH or for type2 CG PUSCH. For example, the wireless communication node 202 (or the wireless communication device 204) can use a first function switch parameter/indication for PUSCH, or for all kinds of PUSCH, including DG PUSCH, type 1 CG PUSCH, type 2 CG PUSCH. The wireless communication node 202 (or the wireless communication device 204) can use a second function switch parameter designated for CG PUSCH, or for all CG PUSCH, including type 1 CG PUSCH, type 2 CG PUSCH. The wireless communication node 202 (or the wireless communication device 204) can use a third function switch parameter designated for type 1 CG PUSCH. The wireless communication node 202 (or the wireless communication device 204) can use a fourth function switch parameter designated for type 2 CG PUSCH.

Besides, or alternative to, the function switch parameter/indication described above, the wireless communication node 202 and the wireless communication device 204 may employ/check one or more other conditions to determine whether or not the shared beam state is to be applied for CG PUSCH. For instance, the condition(s) may include a number of a port for a CG PUSCH transmission being equal to 1. If the number of the port for CG PUSCH is equal to 1, the wireless communication device 204 can apply shared beam state for CG PUSCH. In some implementations, the condition(s) can include the shared beam state being indicated via a DCI transmission for scheduling an uplink transmission. If the shared beam state is indicated by UL DCI, the wireless communication device 204 can apply shared beam state for CG PUSCH. As used herein, UL DCI refers to the DCI scheduling or activating or triggering uplink transmission, such as PUSCH, SRS or PUCCH.

In some embodiments, the wireless communication device 204 may determine an effective time of shared beam state for CG PUSCH. The wireless communication device 204 may determine whether a first time instance occurring a first time period after the command signaling is earlier (or no later) than a second time instance occurring a second time period prior to the target transmission. The wireless communication device 204 may determine, according to the beam state information, a parameter for a target transmission, if the first time instance is determined to be earlier (or no later) than the second time instance.

Figure 4:
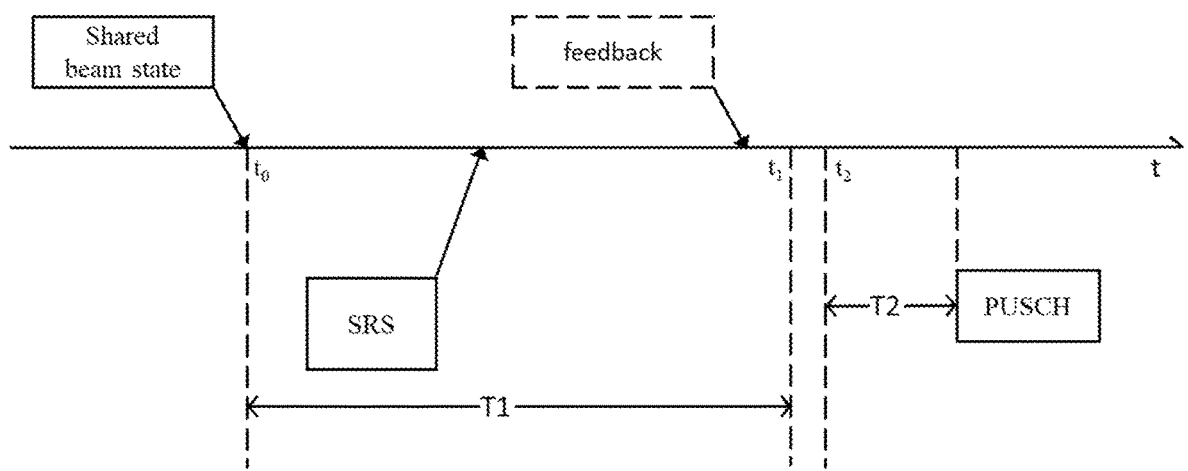
FIG. 4 shows a timeline illustrating an example effective time of shared beam state, according to example embodiments of the current disclosure.

Referring to FIG. 4, a diagram illustrating a timeline illustrating an example effective time of shared beam state is shown, according to example embodiments of the current disclosure. The command signaling, or the signaling of the shared beam state, occurs at time $t_0$. The first time instance is denoted as $t_1$, and it occurs a first time period T1 after $t_0$. The second time instance denoted as $t_2$ occurs a second time period T2 prior to the target transmission (e.g., PSCH transmission). The wireless communication device 204 may determine, according to the beam state information, the parameter (or apply shared beam state for CG PUSCH) for a target transmission, if the wireless communication device 204 determines that $t_2 \geq t_1$.

The first time period T1 can depend on, or can be determined based on, at least one of a transmission time of a feedback message of the wireless communication device 204, a transmission time of at least one SRS corresponding to the shared beam state, a processing time of the wireless communication node 202, or a processing time of the wireless communication device 204. The feedback message of the wireless communication device 204 can include a HARQ-ACK for the DCI indicating the shared beam state, a HARQ-ACK or NACK for the DCI indicating the shared beam state and scheduling a PDSCH transmission, a PUSCH transmission corresponding to the DCI indicating the shared beam state and scheduling or activating a PUSCH transmission, or SRS corresponding to the DCI indicating the shared beam state. Referring back to FIG. 4, the first time period T1 can be equal to the time interval between to (time instance of command signaling) and the time instance at which the feedback message is transmitted.

In some implementations, the first time period T1 can depend on, or can be determined based on, at least one SRS corresponding to the shared beam state. For instance, the first time period T1 can be defined as the time difference between the time instance to (e.g., time instance at which the wireless communication device 204 receives the DCI indicating the shared beam state) and the first or last symbol of SRS corresponding to the shared beam state. The first time period T1 may be defined as the time difference between the time instance when the feedback message is received and the first or last symbol of SRS corresponding to the shared beam state.

In some implementations, the first time period T1 can depend on, or can be determined based on, processing time of the wireless communication node 202. The processing time of wireless communication node 202 can depend on, or can be determined based on, processing time for SRS and/or preparing time for a possible feedback message, which may or may not be transmitted. The possible feedback message may include a RRC signaling for type 1 CG PUSCH or an activation DCI for type 2 CG PUSCH. The first time period T1 can be equal to, or a function of, the processing time of the wireless communication node 202. If the wireless communication node 202 finds that the old parameters besides SRI could be reused for CG PUSCH using the shared beam state (new SRI), the wireless communication node 202 may not prepare a feedback message, otherwise, the wireless communication node 202 may prepare and transmit a feedback message to update parameters corresponding to the shared beam state. In this case, if the wireless communication device 204 receives such possible feedback message from the wireless communication node 202, the wireless communication device 204 can apply the shared beam state and the parameters in the feedback message for CG PUSCH. In some implementations, the first time period T1 can depend on, or can be determined based on, processing time of the wireless communication node 202. The processing time of the wireless communication node 202 can include time for the wireless communication device 204 to process the possible feedback message received from the wireless communication node 202.

In some embodiments, the second time period T2 can depend on, or can be determined based on, a capability of the wireless communication device 204, a minimum value of those provided by parameter k2 in a PUSCH-ConfigCommon information element, or a time period between a DCI scheduling a target transmission and a start of the target transmission. For example, the second time period T2 can be a number of $K^{PUSCH,min}$ symbols equal to the product of a number of symbols per slot $N_{symb}^{slot}$ and the minimum of the values provided by k2 in PUSCH-ConfigCommon for active UL BWP b of carrier f of serving cell c. The second time period T2 may be equal to $T_{proc,2}$ which is determined assuming $d_{2,1}=1$, $d_{2,2}=0$ and with $\mu_{DL}$ corresponding to the subcarrier spacing of the active downlink BWP of the scheduling cell for a configured grant if the first PUSCH transmission is on a configured grant after a power headroom report was triggered. The minimum value of those provided by parameter k2 in a PUSCH-ConfigCommon information element can be configured by the wireless communication node 202 based on the capability of the wireless communication device 204.

In some embodiments, the wireless communication device 204 may determine, according to the beam state information, the parameter for the target transmission with number of ports as 1, if the feedback message is not transmitted earlier than the second instance. Referring back to FIG. 4, if the UE feedback message for the shared beam state is not transmitted earlier than the time instance $t_2$ (or transmitted later than the time instance $t_2$), the wireless communication device 204 can apply the shared beam state for the PUSCH with number of port=1. If UE feedback message (shown in FIG. 4) for the shared beam state is not transmitted earlier than the time instance $t_2$, the wireless communication device 204 can apply the shared beam state for the PUSCH with number of port=1. This is a temporary scheme for CG PUSCH to use shared beam state. When the number of port of PUSCH is one, the wireless communication device 204 does not need multi-input multi-output (MIMO) parameters. As such, the wireless communication device 204 can apply the new beam according to shared beam state for CG PUSCH upon determining that the number of port of PUSCH is one.

CG PUSCH refers to a series of PUSCH transmissions with the same parameters. Hence, the parameters should be as stable as possible. While the shared beam state may be signaled/indicated to the wireless communication device 204 for fast beam changing and flexibility, a smooth beam changing method may be applied. In some embodiments, the wireless communication device 204 may determine, according to a shared beam state (also called a common beam state) of the beam state information, parameters of a CG PUSCH transmission. The beam state may include a beam state for a PDCCH transmission or a PUCCH transmission. The wireless communication device 204 may apply the beam state for PUCCH or PDCCH to CG PUSCH according to the beam state information indicated by the command signaling. For example, the beam state for PUCCH or PDCCH according to the beam state information may be a wide beam associated with the shared beam state.

The beam state may include a beam state associated with a beam state indicated by the beam state information. The wireless communication device 204 can apply the beam state associated with the shared beam state to CG PUSCH. For example, the beam state can include a reference signal in a beam state of an RS with a type of QCL (e.g. 'QCL-TypeD', or a type of QCL assumption, or spatial parameter) in the common beam state, a reference signal quasi co-located with an RS with 'QCL-TypeD' in the common beam state, or a spatial relation reference signal of an RS with 'QCL-TypeD' in the common beam state.

In some embodiments, the wireless communication node 2002 may configure a beam prohibit timer. The wireless communication device 204 cannot apply a new reference SRS for CG PUSCH until the beam prohibit timer expires. The beam prohibit timer may start when a new reference SRS is applied for CG PUSCH.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
receiving, by a wireless communication device from a wireless communication node, a command signaling that indicates beam state information for a plurality of target transmissions;
determining, by the wireless communication device according to the beam state information, parameters of the plurality of target transmissions, which comprises determining, by the wireless communication device according to the beam state information, a first parameter of the parameters that is indicative of a reference sounding reference signal (reference SRS) of at least one of a type 1 configured grant (CG) PUSCH transmission, or a type 2 CG PUSCH transmission; and determining, by the wireless communication device, according to a shared beam state of the beam state information, a parameter indicative of a reference sounding reference signal (reference SRS) in case a defined condition is satisfied; and determining, by the wireless communication device, to maintain at least one parameter unchanged in case the defined condition is not satisfied, or determining, by the wireless communication device, according to the beam state information, a first parameter for a target transmission, when a first time instance occurring a first time period after the command signaling is earlier than a second time instance occurring a second time period prior to the target transmission.

2. The method of claim 1, wherein the plurality of target transmissions comprises at least one of: a physical downlink control channel (PDCCH) transmission, a physical uplink control channel (PUCCH) transmission, a channel state information reference signal (CSI-RS) transmission, a sounding reference signal (SRS) transmission, a dynamic grant (DG) physical uplink shared channel (PUSCH) transmission, one type 1 CG PUSCH transmission, one type 2 CG PUSCH transmission, or a physical downlink shared channel (PDSCH) transmission.

3. The method of claim 1, wherein the command signaling comprises a downlink control information (DCI) signaling or a medium access control control element (MAC CE) signaling.

4. The method of claim 1, wherein the beam state information comprises at least one of: a quasi co-location (QCL) information, a transmission configuration indicator (TCI) state, spatial relation information, reference signal information, spatial filter information, or precoding information.

5. The method of claim 2, comprising at least one of:
determining, by the wireless communication device according to a downlink control information (DCI) signaling or the beam state information, a parameter indicative of at least one of: a pathloss reference signal (PL-RS), a transmitted precoding matrix indicator (TPMI), a number of layers, an antenna port, a modulation and coding scheme (MCS), or a transmission block size (TBS), determining, by the wireless communication device, at least one of: at least one radio resource control (RRC) parameter, at least one access control control element (MAC CE) parameter, or at least one downlink control information (DCI) parameter, that remains same as for at least a previous PUSCH transmission, determining, by the wireless communication device, a parameter according to a rule of a fixed TBS or a fixed code rate for a plurality of CG PUSCH transmissions, or determining, by the wireless communication device, a parameter according to a default or predefined scheme.

6. The method of claim 1, wherein the defined condition comprises the wireless communication device receiving an indication to enable determination of the parameter indicative of the reference SRS, wherein the indication is configured for at least one of: the DG PUSCH transmission, the type 1 CG PUSCH transmission or the type 2 CG PUSCH transmission.

7. The method of claim 1, wherein the defined condition comprises that a number of a port for a CG PUSCH transmission is 1.

8. The method of claim 1, wherein the defined condition comprises that the shared beam state is indicated via a downlink control information (DCI) transmission for scheduling an uplink transmission.

9. The method of claim 1, wherein the first time period is determined according to:
a transmission time of a feedback message of the wireless communication device,
a transmission time of at least one SRS corresponding to a shared beam state,
a processing time of the wireless communication node, or
a processing time of the wireless communication device.

10. The method of claim 1, wherein the second time period is determined according to at least one of:
a capability of the wireless communication device,
a minimum value of those provided by parameter k2 in a PUSCH-ConfigCommon information element, or
a time period between a downlink control information (DCI) scheduling a target transmission and a start of the target transmission.

11. The method of claim 1, comprising:
determining, by the wireless communication device according to the beam state information, the first parameter for the target transmission with number of ports as 1, if a feedback message is not transmitted earlier than the second time instance.

12. A method comprising:
sending, by a wireless communication node to a wireless communication device, a command signaling that indicates beam state information for a plurality of target transmissions, wherein the wireless communication device determines, according to the beam state information, parameters of the plurality of target transmissions, which comprises determining, according to the beam state information, a first parameter of the parameters that is indicative of a reference sounding reference signal (reference SRS) of at least one of a type 1 configured grant (CG) PUSCH transmission, or a type 2 CG PUSCH transmission, and wherein:

the wireless communication device determines, according to a shared beam state of the beam state information, a parameter indicative of a reference sounding reference signal (reference SRS) in case a defined condition is satisfied and the wireless communication device determines to maintain at least one parameter unchanged in case the defined condition is not satisfied, or the wireless communication device determines, according to the beam state information, a first parameter for a target transmission, when a first time instance occurring a first time period after the command signaling is earlier than a second time instance occurring a second time period prior to the target transmission.

13. The method of claim 12, wherein the plurality of target transmissions comprises at least one of: a physical downlink control channel (PDCCH) transmission, a physical uplink control channel (PUCCH) transmission, a channel state information reference signal (CSI-RS) transmission, a sounding reference signal (SRS) transmission, a dynamic grant (DG) physical uplink shared channel (PUSCH) transmission, one type 1 CG PUSCH transmission, one type 2 CG PUSCH transmission, or a physical downlink shared channel (PDSCH) transmission.

14. The method of claim 12, wherein the command signaling comprises a downlink control information (DCI) signaling or a medium access control control element (MAC CE) signaling.

15. The method of claim 12, wherein the beam state information comprises at least one of: a quasi co-location (QCL) information, a transmission configuration indicator (TCI) state, spatial relation information, reference signal information, spatial filter information, or precoding information.

16. A wireless communication device, comprising:
at least one processor configured to:
 receive, via a receiver from a wireless communication node, a command signaling that indicates beam state information for a plurality of target transmissions;
 determine, according to the beam state information, parameters of the plurality of target transmissions, which comprises: determining according to the beam state information, a first parameter of the parameters that is indicative of a reference sounding reference signal (reference SRS) of at least one of a type 1 configured grant (CG) PUSCH transmission, or a type 2 CG PUSCH transmission; and
 determine, according to a shared beam state of the beam state information, a parameter indicative of a reference sounding reference signal (reference SRS) in case a defined condition is satisfied and determine, to maintain at least one parameter unchanged in case the defined condition is not satisfied,
or
 determine, according to the beam state information, a first parameter for a target transmission, when a first time instance occurring a first time period after the command signaling is earlier than a second time instance occurring a second time period prior to the target transmission.

17. A wireless communication node, comprising:
at least one processor configured to:
 send, via a transmitter to a wireless communication device, a command signaling that indicates beam state information for a plurality of target transmissions,
 wherein the wireless communication device determines, according to the beam state information, parameters of the plurality of target transmissions, which comprises the wireless communication device determining, according to the beam state information, a first parameter of the parameters that is indicative of a reference sounding reference signal (reference SRS) of at least one of a type 1 configured grant (CG) PUSCH transmission, or a type 2 CG PUSCH transmission, and wherein:
 the wireless communication device determines, according to a shared beam state of the beam state information, a parameter indicative of a reference sounding reference signal (reference SRS) in case a defined condition is satisfied and determines to maintain at least one parameter unchanged in case the defined condition is not satisfied,
or
 the wireless communication device determines, according to the beam state information, a first parameter for a target transmission, when a first time instance occurring a first time period after the command signaling is earlier than a second time instance occurring a second time period prior to the target transmission.

* * * * *